United States Patent [19]

Mori

[11] 4,194,112

[45] Mar. 18, 1980

[54] PRESETTING COUNTER DEVICE

[75] Inventor: Hiromi Mori, Aichi, Japan

[73] Assignee: Minolta Camera Kabushiki Kaisha, Osaka, Japan

[21] Appl. No.: 26,344

[22] Filed: Apr. 2, 1979

[30] Foreign Application Priority Data

Apr. 13, 1978 [JP] Japan .......................... 53/49275[U]

[51] Int. Cl.[2] ...................... G06F 15/18; G06M 1/00

[52] U.S. Cl. ............................ 235/132 E; 235/91 R; 235/132 R

[58] Field of Search ........... 235/132 R, 132 E, 132 A, 235/103, 91 R; 355/14

[56] References Cited

U.S. PATENT DOCUMENTS

| | | | |
|---|---|---|---|
| 3,096,018 | 7/1963 | Bliss et al. | 235/132 R |
| 3,343,789 | 9/1967 | Wales, Jr. et al. | 235/132 R |
| 3,600,085 | 8/1971 | Altergott | 355/14 |
| 3,710,079 | 1/1973 | Cralle, Jr. et al. | 235/132 A |
| 4,143,963 | 3/1979 | Matsuyama et al. | 355/14 |

FOREIGN PATENT DOCUMENTS

| | | | |
|---|---|---|---|
| 51-75444 | of 1976 | Japan | 235/132 R |
| 53-9321 | of 1978 | Japan | 235/132 R |

*Primary Examiner*—Stephen J. Tomsky
*Attorney, Agent, or Firm*—Watson, Cole, Grindle & Watson

[57] ABSTRACT

A presetting counter device comprising a ratchet wheel coupled to a cycle number setting dial and being stepwise rotatable for reducing the setting of the dial, an indexer engageable with the ratchet wheel in operative relation to the movement of a cyclically movable device to rotate the ratchet wheel stepwise by one pitch thereof at a time, a cycle repeating signal generator, a member movable with the ratchet wheel for actuating the signal generator and having a signal generator actuating portion with the same pitch angle as the ratchet wheel, and the ratchet wheel being adapted to be temporarily halted in the course of its stepwise rotation at a position where the signal generator is held actuated by the actuating member.

5 Claims, 7 Drawing Figures

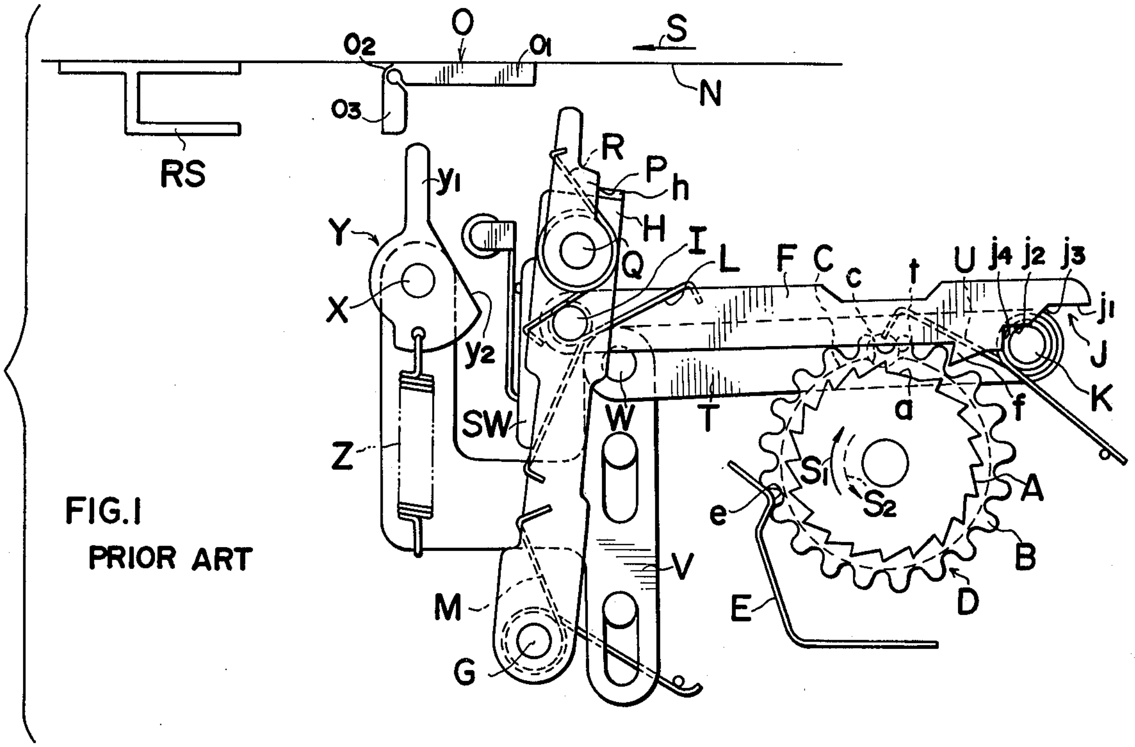
FIG.1
PRIOR ART
FIG.2
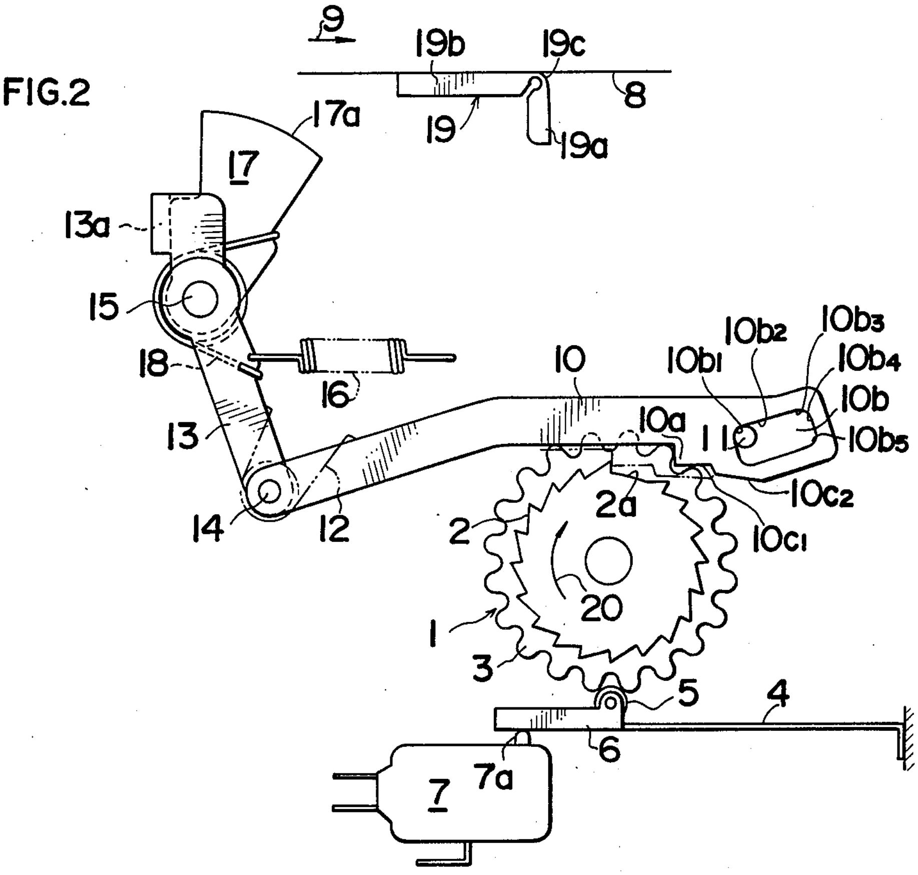

PRESETTING COUNTER DEVICE

BACKGROUND OF THE INVENTION

The present invention relates to a presetting counter device in which the counter setting is successively reduced by a repeated operation, for example, such that a dial set for the desired number of operation cycles is turned for every cycle and returned toward its reference position.

Devices of this type are widely used in copying machines. As shown in FIG. 1 for example, such devices comprise a cycle repeating control drum D coupled to a copy number setting dial (not shown) and fixedly provided with a ratchet wheel A for reducing the setting of the dial, a toothed wheel B having round teeth and providing a click stop at each position to which the ratchet wheel A is indexed, and a cam C having a recess c in its outer periphery. The elastic engagement of a bent portion e of a leaf spring E with the toothed wheel B produces a click at each indexed position of the ratchet wheel. A counter pawl lever F having an actuating pawl f detachably engageable with the ratchet wheel A has a rear end pivotally connected by a pin I to an upper end portion of a counter actuating lever H pivotally connected in place at its rear end by a pin G. The pawl lever F has at its front end a cam portion J resting on a rod K. A spring L acting between the levers F and H biases the pawl lever F in a direction to bring the cam portion J into pressing contact with the rod K and to bias the pawl f toward engagement with the ratchet wheel A. The cam portion J has a first restraining face $j_1$ at the front end of the lever F for retaining the lever F in a position where the pawl f is in engagement with the ratchet wheel A, and a second restraining face $j_2$ extending from a slanting face $j_3$ continuous with the face $j_1$. The second restraining face $j_2$ is adapted to bear against the rod K to hold the pawl lever F in a position shown in FIG. 1 in which the pawl f is out of engagement with the ratchet wheel A.

The actuating lever H is biased by a spring M to urge the pawl lever F toward its front end, usually positioning the second restraining face $j_2$ in pressing contact with the rod K. The contact of a stopper face $j_4$ at the rear end of the second restraining face $j_2$ with the rod K holds the pawl lever F in this position with stability. A driven lever P pivotally connected by a pin Q to the upper end of the actuating lever H is adapted to be acted on by a one-way engaging lever O secured to a document carriage N. The carriage N performs a stroke of reciprocal movement for each copying cycle. A spring R retains the driven lever P in contact with a lug h at the upper end of the actuating lever H. Thus the lever P is held in position as an upper end extension of the actuating lever H and is movable with the lever H under the action of the spring R. The one-way engaging lever O is made of elastic material such as synthetic resin and comprises a base piece $o_1$ attached to the document carriage N and a lever piece $o_3$ connected to the base piece $o_1$ by a thin hinge portion $o_2$. Lever P lies in the path of downwardly extending lever piece $o_3$, so that lever piece $o_3$ kicks the lever P when the document carriage N travels in a direction S, for example, during a return movement. And, the lever piece $o_3$ tilts about the hinge portion $o_2$ away from the lever P when the carriage N travels in the opposite direction.

A reference position detecting lever T, pivotally mounted at its one end on the rod K, is biased by a spring U to cause a projection t thereon to bear against the cam C (as shown in FIG. 1), and has the other end thereof connected by a pin W to a member V vertically movable over a specified distance as determined by the elongated slots in member V in engagement with stop pins (not referenced) mounted in place. A cycle repeating lever Y pivotally connected by a pin X to the upper end of the vertically movable member V has an upwardly projecting driven piece $y_1$ adapted to be acted on by a cycle repeating signal member RS attached to the carriage N. The lever Y further has a cam portion $y_2$ for actuating a switch SW for emitting a cycle repeating signal. The lever Y is so biased by a spring Z that the driven piece $y_1$ is in its upwardly raised position at all times. The one-way engaging lever O opposes the driven lever P at a position different from the position where the signal member RS opposes the cycle repeating lever Y to avoid interference between the opposed pairs.

The illustrated device is in position for making a single copy. The unillustrated copy number setting dial is set in its reference position for making one copy, and the control drum D is also in its reference position. The projection t on the reference position detecting lever T is held in the recess c of the cam C by the action of the spring U. The lever T has been turned counter-clockwise in FIG. 1, holding the vertically movable member V in its lowered position. Accordingly the cycle repeating lever Y is also in its lowered position with its driven piece $y_1$ retracted from the path of travel of the cycle repeating signal member RS. Even when the document carriage N travels, the member RS does not push the lever Y to cause the lever Y to actuate the switch SW. With no repeating signal emitted from the switch SW, the copying operation is terminated upon completion of the single copying cycle.

The pawl of the pawl lever F opposes the toothless portion a of the ratchet wheel A. When the document carriage N returns, the lever piece $o_3$ of the one-way engaging lever O kicks the driven lever P, causing the actuating lever H to move the pawl lever F leftward. With the leftward movement of the lever F, the portion of the lever F in contact with the rod K shifts from the second restraining face $j_2$ to the slanting face $j_3$ and then to the first restraining face $j_1$, rendering the pawl f engageable with the ratchet wheel A. However, the leftward movement brings the pawl f into sliding contact with the toothless portion a without rotating the control drum D. Consequently the copy number setting dial remains in the position of single copy setting.

When the counter device is to be set for more than one copy, the control drum D is turned by the setting dial in the direction of arrow $S_1$ by an amount corresponding to the number of copies, n, bringing the ratchet wheel A to a position in which the $(n-1)$th tooth thereof from the toothless portion a is opposed to the pawl f. Similarly the recessed portion c of the cam C is turned through the same angle, pushing out the projection t on the detecting lever T from the recess c onto the outer periphery of the cam C and thereby turning the lever T clockwise in FIG. 1. This movement causes the lever T to raise the vertically movable member V, consequently positioning the driven piece $y_1$ of the lever Y in the path of travel of the signal member RS.

The movement of the document carriage N in this state causes the member RS to kick the driven piece $y_1$.

When the driven piece $y_1$ is kicked during the forward travel of the carriage N, the actuating lever Y turns clockwise in FIG. 1 without permitting the cam portion $y_2$ to act on the switch SW, whereas only when the lever Y is turned counterclockwise by the pushing contact of the member RS with the driven piece $y_1$ during the return of the carriage N, the cam portion $y_2$ actuates the switch SW, which in turn emits a signal for the repetition of the cycle. During the return of the carriage N, the lever piece $o_3$ also kicks the driven lever P, moving the pawl lever F leftward as aforedescribed. With this movement, the pawl f comes into engagement with the tooth opposed thereto of the ratchet wheel A and rotates the control drum D in the direction of arrow $S_2$ by an amount corresponding to the pitch of the wheel A. This reduces the setting of the dial by one. Thus the number of copies set on the counter is cyclically reduced in succession. With the setting reduced to one, the device is restored to the illustrated position to terminate the copying operation.

With the conventional device described above, one control drum is used for the reduction of the setting and the attendant return of the cycle number setting dial as well as for the repetition and termination of the operation cycle. The device further includes two lever mechanisms for reducing the setting (and returning the setting dial) and for controlling the repetition of operation cycle, respectively. The device incorporating these components within a small limited space is difficult to design, necessitates a complex arrangement of levers, is complex in construction and requires a cumbersome assembling procedure. Such a device is therefore liable to malfunctions and is costly to manufacture.

SUMMARY OF THE INVENTION

An object of the present invention is to provide a novel and very useful presetting counter device.

Another object of the invention is to provide a presetting counter device free of the drawbacks of conventional devices described above.

A further object of the invention is to provide a presetting counter device of simple construction.

A still further object of the invention is to provide a presetting counter device which operates reliably.

A still further object of the invention is to provide a presetting counter device suited for use in copying machines.

These and other objects of this invention can be fulfilled substantially by a presetting counter device comprising a mechanism for reducing the counter setting which incorporates a switch member for generating cycle repeating signals to thereby eliminate the lever arrangement which would otherwise be needed for controlling the repetition of operation cycle. Stated more specifically the objects of the invention can be fulfilled by a presetting counter device comprising a ratchet wheel coupled to a cycle number setting dial and stepwise rotatable for reducing the setting of the dial, indexing means engageable with the ratchet wheel in operative relation to the movement of a cyclically movable device to rotate the ratchet wheel stepwise by one pitch thereof at a time, means for generating cycle repeating signals, a member movable with the ratchet wheel for actuating the signal generating means and having a signal generating means actuating portion with the same pitch angle as the ratchet wheel, and means for temporarily stopping the ratchet wheel in the course of its stepwise rotation at a position where the signal generating means is held actuated by the actuating member.

More specifically the member for actuating the signal generating means is rotatable with the ratchet wheel and has a toothed portion serving as a click stop at each indexed position of the ratchet wheel.

The indexing means includes a spring-loaded transmitting member rendered operatively associated, for a required period of time, with the movement of the cyclically movable device to retain the ratchet wheel in its temporarily stopped position for that period of time and to absorb an excess action while the ratchet wheel is in its stopped position.

The indexing means comprises a member reciprocally movable by the movement of the cyclically movable device and having a pawl engageable with a tooth of the ratchet wheel to index the wheel, the member further having engaging faces which, when the pawl engages the tooth of the wheel, engage the slanting faces of other teeth thereof to serve as the temporarily stopping means.

The driven portion of the signal generating means to be directly operated by the actuating member is adapted to have a restoring force for completing the stepwise rotation of the ratchet wheel subsequent to the temporary interruption.

These and other objects, advantages and novel features of the invention will become more apparent from the following detailed description thereof when taken in conjunction with the accompanying drawings which illustrate exemplary embodiments of the invention.

BRIEF DESCRIPTION OF THE DRAWINGS

FIG. 1 is a side elevational view showing a conventional presetting counter device;

FIGS. 2 to 7 are views showing a presetting counter device embodying the present invention and adapted for use in a copying machine;

FIGS. 2 and 3 show the device before starting to operate for making a single copy;

FIGS. 4 and 5 show a drum in its temporarily stopped position during operation for making a plurality of copies;

FIG. 6 shows the drum in its temporarily stopped position for making the (n−2)th copy when the device is set for n copies; and FIG. 7 shows the drum in its temporarily stopped position for making the (n−1)th copy when the device is set for n copies.

In the following description, like parts are designated by like reference numbers throughout the several Figures of the accompanying drawings.

DETAILED DESCRIPTION OF THE INVENTION

With reference to the accompanying drawings, a detailed description is made below of a presetting counter device embodying the present invention and adapted for use in a copying machine.

Figure 3:
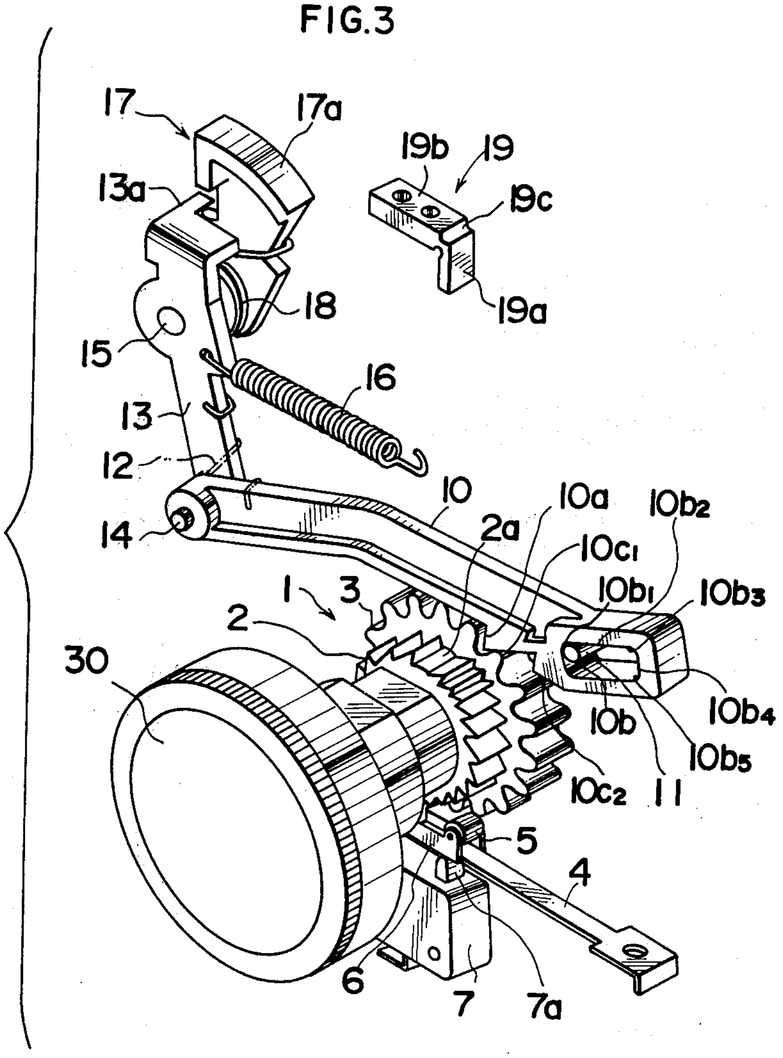

FIGS. 2 and 3 show a control drum 1 coupled to a copy number setting dial 30 (FIG. 3) having a ratchet wheel 2 adapted to reduce the setting of the dial and a toothed wheel 3 mounted thereon for rotation with the dial 30. Wheel 2 has a toothless portion 2*a*, and the toothed wheel 3 has round teeth for providing a click stop at each indexed position of the wheel 2. A leaf spring 4 fixed at its base end has a forward end provided with an actuating member 6 carrying a roller 5. The roller 5 is in engagement with the toothed wheel 3. A microswitch 7 for generating cycle repeating signals has an actuating piece *7a* opposed to the rear side of the actuating member 6. Every time the control drum 1 is rotated stepwise for reducing the dial setting, the roller 5 passes over a tooth of the wheel 3, thereby retracting the actuating member 6. The member 6, when retracted, pushes the actuating piece *7a* to actuate the microswitch 7 for the emission of a signal. Whereas the signal from the switch 7 functions to change over a cycle repeating relay which must be held energized for a certain period of time (for at least 10 msec, preferably about 60 msec), the action of the toothed wheel 3 on the switch 7, if afforded solely by the stepwise rotation of the drum 1 effected by the ratchet wheel 2, will take place only instantaneously by virtue of the clicking action of the leaf spring 4, thus failing to keep the relay energized for the desired period of time.

The toothed wheel 3 is therefore adapted to act on the switch 7 for a sufficient time period when the ratchet wheel 2 is indexed tooth-by-tooth by a counter pawl lever 10 which is moved by a one-way engaging lever 19 during the return travel of a movable document carriage 8 in the direction of an arrow 9. The pawl lever 10 is provided at its one end with a pawl 10*a* engageable with the ratchet wheel 2 to rotate the wheel 2 tooth-by-tooth and is guided by a pin 11 at that one end. The other end of the pawl lever 10 is connected by a pin 14 to the lower end of an operating lever 13 movable by the one-way engaging lever 19 attached to the document carriage 8. The lever 13 is pivoted as at 15 and is biased by a spring 16 in such a direction that the pawl lever 10 is urged toward the above-mentioned one end, namely rightward in FIG. 2. A driven lever 17 mounted also on the pivot 15 is held by a spring 18 in contact with a lug 13*a* at the upper end of the lever 13. The force of the spring 18 renders both the levers 13 and 17 movable together. With the upper end of the driven lever 17 positioned in the path of travel of a lever piece 19*a* of the engaging lever 19, the lever piece 19*a* is adapted to act on the lever 17. The lever 19 is made of elastic material such as soft synthetic resin and includes a base piece 19*b* attached to the carriage 8 and a thin hinge portion 19*c* connecting the lever piece 19*a* to the base piece 19*b*. The lever piece 19*a* retains its raised perpendicular position relative to the base piece 19*b* and kicks the lever 17 when coming into contact with the lever 17 during the return travel of the carriage 8 in the direction of arrow 9. However, the lever piece 19*a* tilts about the hinge portion 19*c* away from the lever 17 and will not kick the lever 17 upon coming into contact with the lever 17 during the forward travel of the carriage 8. When the lever piece 19*a* kicks the lever 17 with the return of the carriage 8, the operating lever 13 turns about the pivot 15 clockwise in FIG. 2 and moves the pawl lever 10 leftward, bringing the pawl 10*a* into engagement with the ratchet wheel 2. The pawl rotates the wheel 2 by one tooth to reduce the setting of the dial.

Figure 4:
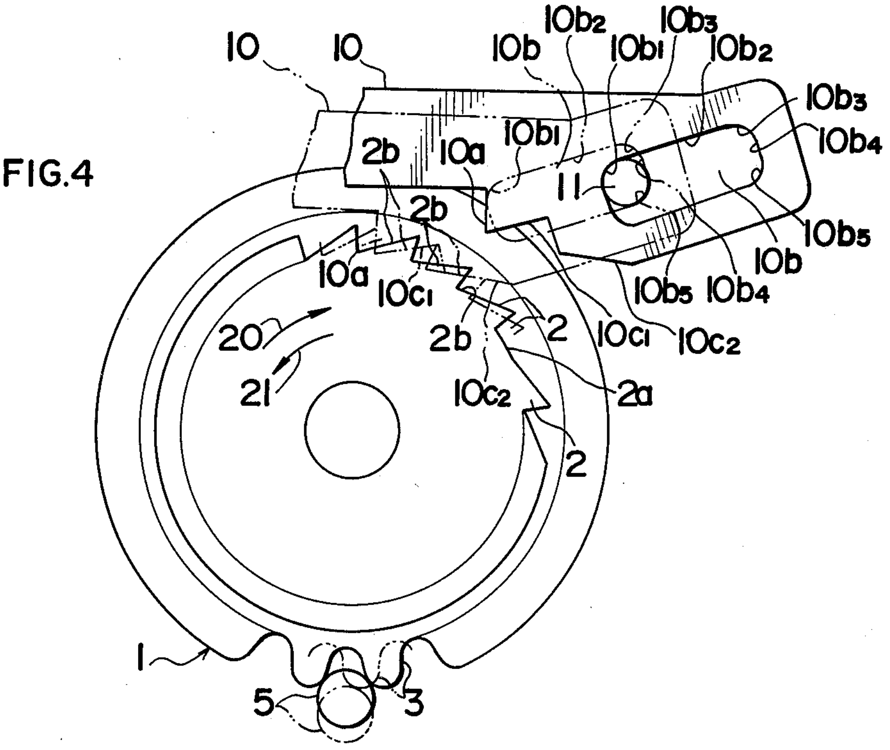

With reference to FIG. 4, the pawl lever 10 is formed in its one end with a rectangular cam aperture 10*b* having the pin 11 lying therein. The pin 11 is fixedly mounted in place and coacts with the cam apertured portion 10*b* to guide the pawl lever 10, such that the pawl lever 10 is restrained from further movement when it has turned the wheel 2 to a position in which the roller 5, after passing over the top of a tooth of the wheel 3, is located immediately to the rear of that top (the phantom outline position of FIG. 4). The cam aperture 10*b* extends slightly upwardly toward the distal end of the lever 10. The pawl lever 10 has an engaging face $\mathbf{10}c_1$ on the back side of the pawl 10*a* and another engaging face $\mathbf{10}c_2$ adjacent to and on the right side of the pawl. These engaging faces are adapted for face-to-face contact with the slanting faces 2*b* of two teeth immediately adjacent to, and on the right side of, the tooth of the ratchet wheel 2 to be advanced by the pawl 10*a* so as to temporarily stop the ratchet wheel 2 in the course of its stepwise rotation while the lever 10 is held against movement. Thus these engaging faces $\mathbf{10}c_1$ and $\mathbf{10}c_2$ prevent the toothed wheel 3 from turning to a position where the roller 5 engages in a furrow portion thereof under the clicking action of the leaf spring 4. The operating lever 17 is in the form of a sector and has a circular arc guide surface 17*a* for guiding the lever piece 19*a* away from the lever 17 when the lever piece comes into contact therewith during the forward travel of the carriage 8.

FIGS. 2 and 3 show the device before starting to operate for making one copy. With the left upper corner $\mathbf{10}b_1$ of the apertured portion 10*b* bearing on the pin 11, the pawl lever 10 is held in its rightward limit position by the action of the spring 16 and by the clockwise moment about the pin 14 afforded by the gravity acting on the lever 10. The ratchet wheel 2 is in its reference position with the toothless portion 2*a* opposed to the pawl 10*a* of the lever 10. The roller 5 is in engagement with a furrow portion of the toothed wheel 3 under the action of the spring 4 to thereby hold the ratchet wheel 2 in the reference position. With the roller 5 thus engaged with the wheel 3, the actuating member 6 is positioned close to the drum 1 without acting on the actuating piece *7a* of the switch 7. The switch 7 is therefore in an inoperative position. The carriage 8 is in its standby position, and the lever piece 19*a* is located on the right side of the driven lever 17.

When the copying machine is initiated into operation by closing an unillustrated print switch, the document carriage 8 travels leftward opposite to the direction of the arrow 9. On contact with the driven lever 17 during the travel, the lever piece 19*a* tilts away therefrom without operating the setting reducing mechanism. Subsequently the carriage returns on completing the projection of the image of the document to be copied. During the return travel, the lever piece 19*a* comes into contact with the driven lever 17 from the left side thereof in the direction of the arrow 9, whereupon the lever piece 19*a* is raised to a position perpendicular to the base piece 19*b* and kicks the lever 17, thereby turning the lever 17 along with the operating lever 13 about the pivot 15 in a clockwise direction in FIG. 2. The lever 13 moves the pawl lever 10 leftward with the upper edge $\mathbf{10}b_2$ of the apertured portion 10*b* sliding on the pin 11. This movement brings the pawl 10*a* downward along the slope of the upper edge $\mathbf{10}b_2$ to a position where the pawl is engageable with the ratchet wheel 2. However, the pawl 10*a* as well as the engaging faces $\mathbf{10}c_1$ and $\mathbf{10}c_2$ acts on the toothless portion 2*a* as indicated in a phantom outline in FIG. 2 and does not engage the ratchet wheel 2. The drum 1 therefore remains out of rotation. Accordingly, the switch 7 will not operate to repeat the copying cycle. The drum 1 remains in its reference position. Thus the copying machine makes only one copy every time the print switch is closed. On disengagement of the lever piece 19*a* from the lever 17, the levers 17, 13 and 10 are restored to the solid outline position of FIG. 2 by the action of the spring 16.

To make n copies, the control drum 1 is turned in the direction of arrow 20 in FIG. 4 by the setting dial 30 shown in FIG. 3 so that the (n−1)th tooth from the toothless portion *2a* of the wheel 2 is opposed to the pawl 10*a*. The roller 5 initially engaging in a furrow of the toothed wheel 3 engages in the (n−1)th furrow from that furrow to retain the drum 1 in the turned position.

When the carriage 8 returns after the start of the copying operation, causing the lever piece 19*a* to kick the driven lever 17 to move the pawl lever 10 leftward, the pawl 10*a* engages the tooth opposed thereto and advances the tooth in the direction of arrow 21. At this time, the pawl lever 10 in the solid outline position of FIG. 4 and bearing on the pin 11 at the left upper corner 10*b*$_1$ of the apertured cam portion 10*b*, is guided by the pin 11 to the phantom outline position in which the pin 11 is at the right lower corner 10*b*$_5$ of the portion 10*b* in such manner that the inner periphery of the lever end defining the cam aperture 10*b* slides on the pin 11 first along the upper edge 10*b*$_2$, then along the right upper corner 10*b*$_3$ and finally along the right edge 10*b*$_4$. With this movement which is delivered to the toothed wheel 3 via the ratchet wheel 2, the top of a round tooth depresses the roller 5, permitting the roller 5 to move over the top to the phantom outline position of FIG. 4 in which the roller is located immediately to the rear of the top extremity of the round tooth. The pawl lever 10 is restrained from further leftward movement by the pin 11 when the lever has turned the control drum 1 in the direction of arrow 21 to this position. The actuating member 6, moved away from the drum 1 by the depression of the roller 5, pushes the actuating piece 7*a* of the switch 7 as seen in FIG. 5, causing the switch to emit a cycle repeating signal.

Figure 5:
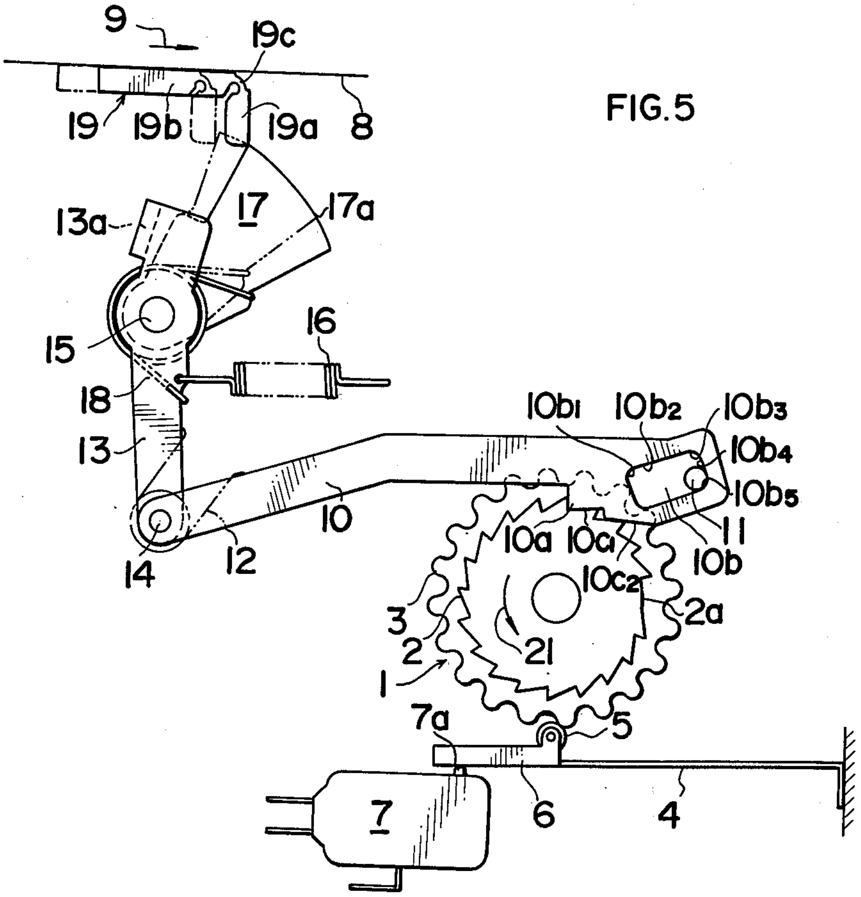

The driven lever 17, which is kicked by the lever piece 19*a* on the returning carriage 8, is so designed that it is held in engagement with the piece 19*a* after the lever 17 has been turned to the phantom outline position of FIG. 5 to actuate the switch 7 until it is further turned to the solid outline position of FIG. 5. During this period of time Tm, the driven lever 17 is turned independently of the operating lever 13 against the spring 18 while absorbing the excessive action of the lever piece 19*a* and allowing the lever 13 to retain the pawl lever 10 in the leftward limit position against the spring 16. Consequently the lever 10 does not exert any force on the drum 1 in the phantom outline position of FIG. 4, or in the position of FIG. 5, to turn the drum further in the direction of arrow 21, whereas the force of the leaf spring 4 on the roller 5 as a click stop holds the roller 5 in pressing contact with a rear portion of the above-mentioned round tooth immediately adjacent its top, thus acting to turn the drum 1 in the direction of arrow 21 through the toothed wheel 3. Despite the tendency of the drum 1 to rotate in this direction, the slanting faces 2*b* of the two teeth on the right side of the tooth engaged by the pawl 10*a* are held by the torque of the drum 1 in face-to-face contact with the engaging faces 10*c*$_1$ and 10*c*$_2$ of the pawl lever 10, as indicated in the phantom outline of FIG. 4 or of FIG. 5, with the result that the drum 1 is prevented from rotation by the pawl lever 10 retained in the leftward limit position.

During the period of time Tm, therefore, the control drum 1 is temporarily stopped in the phantom outline position of FIG. 4 or in the position of FIG. 5, keeping the switch 7 actuated. The time period Tm can be set as desired in accordance with the amount of the engagement between the driven lever 17 and the lever piece 19*a* to hold the relay energized for the period of time required for a change-over to repeat the operation cycle. This assures a proper cyclical operation.

With reference to FIG. 5, when the lever piece 19*a* disengages from the driven lever 17 with a further returning movement of the carriage 8 in the direction of the arrow 9, the driven lever 17, operating lever 13 and pawl lever 10 are restored to the original condition of FIG. 2 by the action of the springs 18 and 16. Consequently, the pawl 10*a* and the engaging faces 10*c*$_1$ and 10*c*$_2$ of the pawl lever 10 release the ratchet tooth and tooth slanting faces 2*b*, thus freeing the control drum 1. By the force of the spring 4 exerted via the roller 5 on the toothed wheel 3, the drum 1 is rotated, permitting the roller 5 to engage in the furrow of the wheel 3, whereupon the drum 1 is held against further rotation by the click stop action. The drum 1 has been completely rotated in the direction of arrow 21 by one tooth of the wheel 2, reducing the copy number setting by one in operative relation to the dial.

Figure 6:
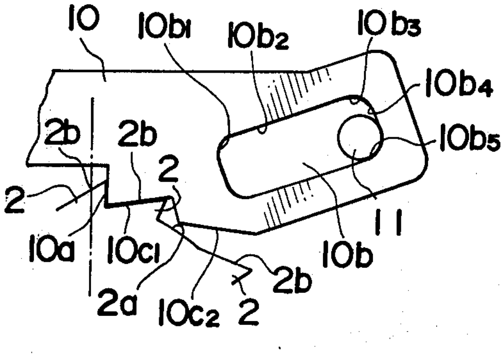

After the completion of the copying cycle, the relay functions in response to the signal from the switch 7 to perform the next copying cycle. with the repetition of the foregoing operation, the drum 1 rotates stepwise in the direction of arrow 21 to successively reduce the dial setting, bringing the toothless portion 2*a* progressively toward the position opposed to the pawl 10*a*. When the pawl lever 10 is moved leftward for the (n−1)th copy, the pawl 10*a* engages the (n−2)th tooth from the toothless portion 2*a*, as seen in FIG. 6, to index the drum 1. In this case, the engaging face 10*c*$_1$ of the pawl lever 10 comes into face-to-face contact with the slanting face 2*b* of the tooth adjacent to, and on the left side of, the toothless portion 2*a* to properly hold the drum 1 in a temporarily stopped position. When making the (n−1)th copy, the pawl 10*a* engages the tooth adjacent to, and on the left side of, the toothless portion 2*a* as seen in FIG. 6 to index the drum 1, and the engaging face 10*c*$_2$ comes into face-to-face contact with the slanting face 2*b* of the tooth adjacent to, and on the right side of, the toothless portion 2*a* to properly hold the drum 1 temporarily. At the same time, the engaging face 10*c*$_2$ acts to prevent excessive rotation of the drum 1 due to the kinetic energy of the pawl lever 10 afforded by the returning speed of the carriage 8, inertial force of rotation of the drum 1 and the click stop action of the leaf spring 4.

Figure 7:
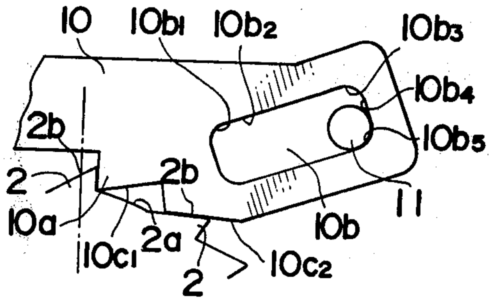

Before the device starts to operate for the last of the copying cycles set thereon, the toothless portion 2*a* has been completely returned to the reference position of FIG. 2 from the position of FIG. 7. The parts perform the operation described with reference to FIG. 2, without indexing the drum 1 and actuating the switch 7. On completion of the set copying cycles, the device no longer permits any further copying operation.

Although the embodiment described above is adapted for use in a copying machine including a movable document carriage, the driven lever 17, when incorporated in a copier in which the optical system is movable, may be rendered operable by the travel of the optical system. Whereas the embodiment has been described as used in a copying machine, the present invention is useful for any apparatus involving a cyclical operation, in which case the driven lever 17 is made operable by the desired member operatively associated with the cyclical movement. Briefly, the device of this invention is characterized by a ratchet wheel steppingly rotatable to successively reduce the counter setting every time the operation is repeated, a cycle repeating signal generator, and a member movable with the ratchet wheel and including a generator actuating portion having the same pitch as the ratchet wheel, the ratchet wheel being adapted to be temporarily halted in the course of its stepwise rotation with the generator held actuated so as to enable the generator to produce a cycle repeating signal with sufficient duration. The illustrated mechanism, an exemplary embodiment of this feature, can be modified variously. For example, the pawl 10a will act on the ratchet wheel 2 more reliably if a spring 12 is provided for biasing the pawl lever 10 toward the drum as indicated in a phantom outline of FIGS. 2, 3 and 5. The toothed wheel 3 need not always be made serviceable also as a click stop element, or may be a wheel which is provided independently of, but in operative relation to, the ratchet wheel. The switch 7 may be directly engageable with the toothed wheel 3 and can be designed to serve as a click stop element. The pawl 10a can be shaped differently as desired in conformity with the shape of the ratchet teeth.

The device of this invention has a very simple construction essentially comprising a ratchet wheel steppingly rotatable for reducing the setting of the counter, means for generating cycle repeating signals, and actuating member movable with the ratchet wheel and including a signal generating means actuating portion having the same pitch as the ratchet wheel, and an operating assembly for steppingly rotating the ratchet wheel every time the operation is repeated and for temporarily stopping the wheel during its stepwise rotation. The device is therefore easy to design and assemble for installation in a small space, less prone to failures and quite inexpensive to manufacture. The device has another feature in that the interruption of the stepwise rotation of the ratchet wheel permits the switch to produce a cycle repeating signal for a sufficient period of time, thus assuring the repetition of operation with high reliability.

Although the present invention has been fully described by way of example with reference to the accompanying drawings, it is to be noted that various changes and modifications are apparent to those skilled in the art. Therefore, unless otherwise such changes and modifications depart from the scope of the present invention, they should be construed as included therein.

I claim:

1. A presetting counter device operable by a cyclically movable device, comprising, a ratchet wheel coupled to a cycle number setting dial and being rotatable stepwise for reducing the setting of the dial, indexing means engageable with the ratchet wheel in operative relation to the movement of the cyclically movable device to rotate the ratchet wheel stepwise by one pitch thereof at a time, means for generating cycle repeating signals, a member coupled to the ratchet wheel for movement therewith, said member including a signal generating means actuating portion having the same pitch angle as the ratchet wheel, the actuating portion engaging the signal generating means for actuating same, and the indexing means including a means for temporarily stopping the ratchet wheel in the course of its stepwise rotation at a position where the signal generating means is held actuated by the actuating member.

2. The presetting counter device according to claim 1, wherein the member for actuating the signal generating means is rotatable with the ratchet wheel and has a toothed portion serving as a click stop at each indexed position of the ratchet wheel.

3. The presetting counter device according to claim 1, wherein said indexing means includes a spring-loaded transmitting member rendered operatively associated, for a predetermined period of time, with the movement of the cyclically movable device to retain the ratchet wheel in its temporarily stopped position for the period of time and to absorb an excess action while the ratchet wheel is in its stopped position.

4. The presetting counter device according to claim 1, wherein said indexing means comprises a member reciprocally movable by the movement of the cyclically movable device and having a pawl engageable with a tooth of the ratchet wheel to index the wheel, the member further having engaging faces which, when the pawl engages the tooth of the wheel, engage the slanting faces of other teeth thereof to serve as the temporarily stopping means.

5. The presetting counter device according to claim 1, wherein the signal generating means has a driven portion operable directly by the actuating member, the driven portion being spring biased toward the actuating member to thereby include a restoring force for completing the stepwise rotation of the ratchet wheel subsequent to the temporary interruption.

* * * * *